(12) United States Patent
Nickel et al.

(10) Patent No.: US 11,415,189 B2
(45) Date of Patent: Aug. 16, 2022

(54) ACTUATING DEVICE FOR A COUPLING/BRAKING DEVICE AND COUPLING/BRAKING DEVICE WITH SUCH AN ACTUATING DEVICE

(71) Applicants: KACO GmbH + Co. KG, Kirchardt (DE); Miba Frictec GmbH, Laakirchen (AT)

(72) Inventors: Falk Nickel, Gmunden (AT); David Pühringer, Laakirchen (AT); Andreas Genesius, Heilbronn (DE); Wilhelm Wunder, Ilsfeld (DE)

(73) Assignees: KACO GmbH + Co. KG, Kirchardt (DE); Miba Frictec GmbH, Laakirchen (AT)

( * ) Notice: Subject to any disclaimer, the term of this patent is extended or adjusted under 35 U.S.C. 154(b) by 276 days.

(21) Appl. No.: 16/827,735

(22) Filed: Mar. 24, 2020

(65) Prior Publication Data

US 2020/0309218 A1 Oct. 1, 2020

(30) Foreign Application Priority Data

Mar. 25, 2019 (DE) ...................... 10 2019 002 213.0

(51) Int. Cl.
*F16D 67/00* (2006.01)
*F16D 65/097* (2006.01)
*F16D 65/18* (2006.01)
*F16D 55/40* (2006.01)
*F16D 25/08* (2006.01)
(Continued)

(52) U.S. Cl.
CPC ........... *F16D 67/00* (2013.01); *F16D 25/083* (2013.01); *F16D 25/123* (2013.01); *F16D 55/40* (2013.01); *F16D 65/0971* (2013.01); *F16D 65/186* (2013.01); *F16D 2121/04* (2013.01); *F16D 2125/06* (2013.01); *F16D 2250/0046* (2013.01); *F16D 2250/0084* (2013.01); *F16D 2300/10* (2013.01)

(58) Field of Classification Search
CPC ...... F16D 25/082; F16D 25/083; F16D 25/12; F16D 25/123; F16D 55/40; F16D 65/0971; F16D 65/186; F16D 67/00; F16D 2121/04; F16D 2125/06; F16D 2250/0046; F16D 2250/084; F16D 2300/10; F16J 1/01; F16J 1/02
USPC ............................................ 192/85.29, 85.53
See application file for complete search history.

(56) References Cited

U.S. PATENT DOCUMENTS

| | | | | |
|---|---|---|---|---|
| 4,306,636 A | * | 12/1981 | Burgdorf | F16D 55/2262 188/73.43 |
| 5,033,591 A | * | 7/1991 | Price | F16D 55/14 188/106 F |
| 2007/0034475 A1 | * | 2/2007 | Capita | B60K 23/0808 180/249 |

* cited by examiner

*Primary Examiner* — Richard M Lorence
(74) *Attorney, Agent, or Firm* — Gudrun E. Huckett

(57) ABSTRACT

An actuating device for a coupling/braking device is provided with at least one actuating piston that is axially slidable relative to a shaft and, in an actuating state, exerts an axially acting contact pressure on coupling/braking parts of the coupling/braking device. At least one control piston is provided that axially displaces the at least one actuating piston into the actuating position. A coating is provided in a contact region between the actuating piston and the control piston, wherein the coating is disposed at the actuating piston or at the control piston or at both the actuating piston and the control piston. The actuating piston can also be designed as a control piston that interacts immediately with the coupling/braking parts of the coupling/braking device.

17 Claims, 3 Drawing Sheets

(51) Int. Cl.
*F16D 25/12* (2006.01)
*F16D 121/04* (2012.01)
*F16D 125/06* (2012.01)

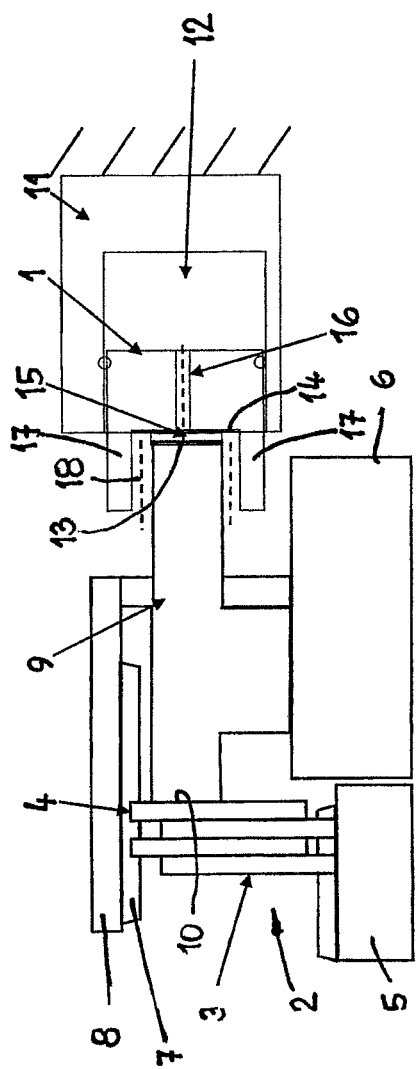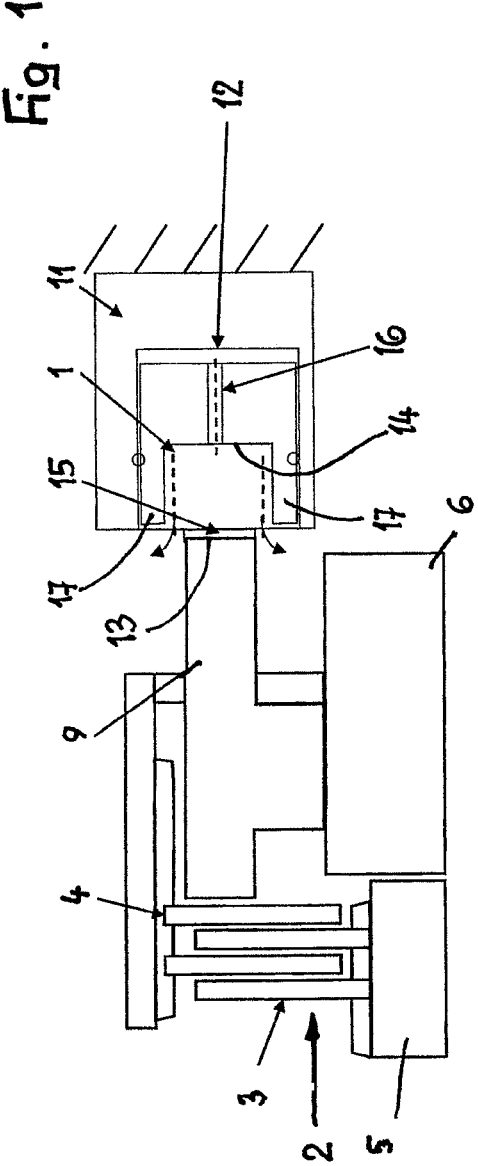

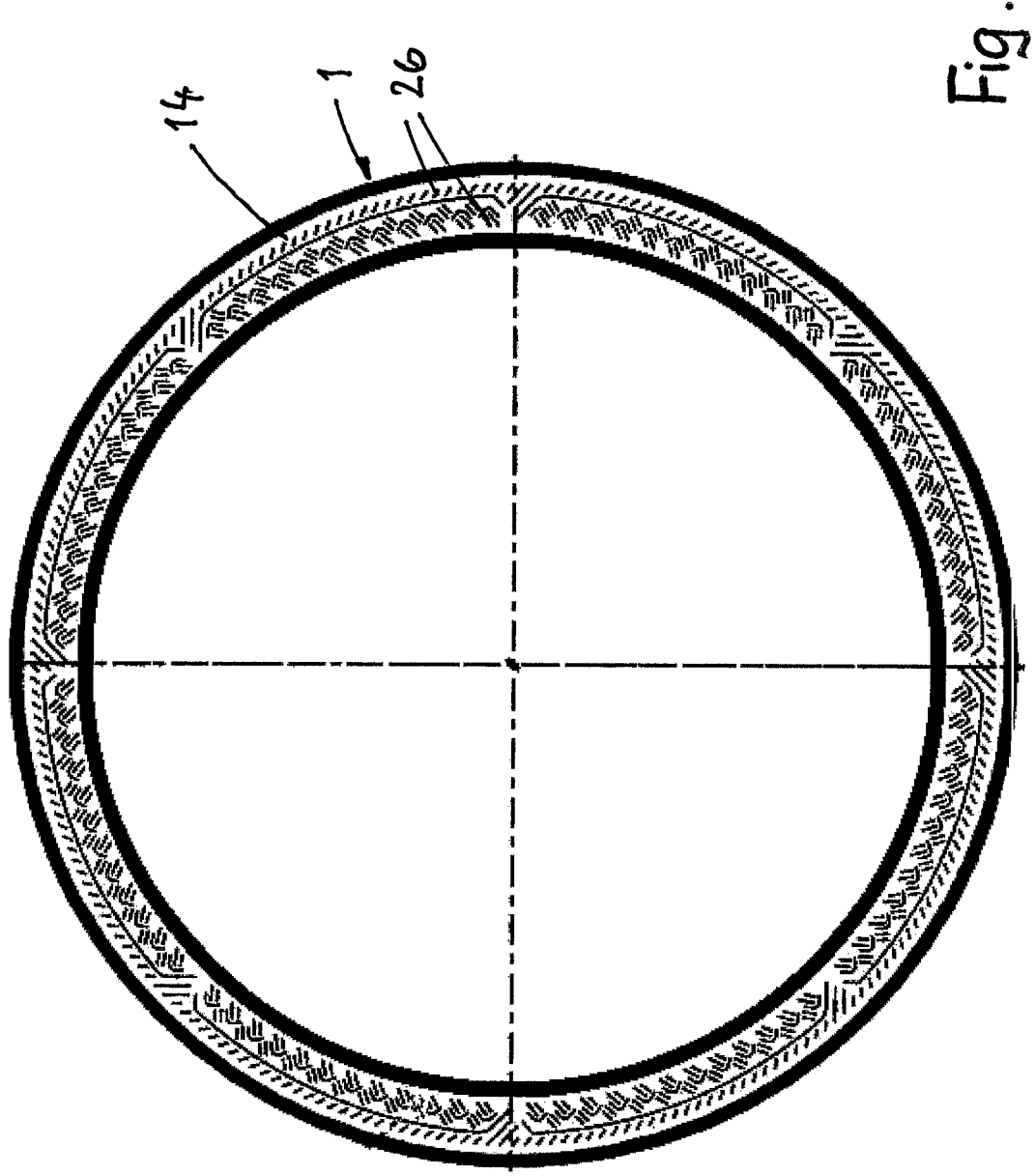

ACTUATING DEVICE FOR A COUPLING/BRAKING DEVICE AND COUPLING/BRAKING DEVICE WITH SUCH AN ACTUATING DEVICE

BACKGROUND OF THE INVENTION

The invention concerns an actuating device for a coupling/braking device, with at least one actuating piston that is axially slidable relative to a shaft and, in the actuating state, exerts an axially acting contact pressure on coupling/braking parts.

The invention further concerns a coupling/braking device comprising such an actuating device.

For actuating disc pack couplings, hydraulically actuated actuating pistons are known. They are located in the immediate vicinity of the disc pack of the disc pack coupling and rotate in the actuating state together with the disc pack.

Also known are stationary actuating pistons which are acting rotationally decoupled by means of an axial rolling bearing on the disc pack of the disc pack coupling. Such solutions are in particular provided for slowly rotating systems such as differential locks or all-wheel couplings.

Moreover, conventional control pistons are known also in conventional couplings in the automotive sector.

Such coupling/braking devices are comprised of many individual components which must be adjusted to each other within the complete system and are in contact during actuation. Mounting of such a plurality of components makes the handling expenditure unnecessarily complex and cost-intensive.

The invention has the object to configure the actuating device as well as the coupling/braking device such that handling during assembly of the complete system can be simplified and costs can be reduced.

SUMMARY OF THE INVENTION

This object is solved for the actuating device of the aforementioned kind in accordance with the invention in that the actuating piston is axially displaceable by at least one control piston into the actuating position and in that, in the contact region between the actuating piston and the control piston, a coating is provided at the actuating piston and/or at the control piston.

This object is further solved for the actuating device of the aforementioned kind in accordance with the invention in that the actuating piston is a control piston which interacts immediately with the coupling/braking parts and in that at least one coating is provided in the contact region between the coupling/braking parts and the control piston.

This object is solved for the coupling/braking device in that it comprises an actuating device according to the present invention.

The actuating device according to the invention has the actuating piston which is displaced axially into the actuating position by the at least one control piston. The control piston can therefore be arranged in the region outside of the coupling/braking parts. The control piston is displaced from its initial position in axial direction and pushes the actuating piston into the actuating position. The actuating piston is rotated together with the coupling/braking parts about its axis while the control piston is only axially displaceable. In this way, a type of sliding coupling is generated in the contact region between the actuating piston and the control piston. In this region, the coating is provided that is preferably a sliding coating and ensures that wear of the two pistons is minimal in this contact region. The coating can be provided at the actuating piston and/or at the control piston. When the coating is designed as a sliding coating, it ensures that the friction between the two pistons is minimal so that a long service life of the actuating piston is ensured and no metallic rubbing between the two pistons occurs.

A sliding coating can be, for example, a sliding lacquer but also a DLC (diamond-like carbon) coating. Other materials that exhibit a good sliding action can be employed also.

Since the coating is provided at the actuating piston and/or at the control piston, no additional component is necessary.

The coating is advantageously provided along the outer circumference of the actuating piston and/or of the control piston.

It is advantageous when the coating is configured in a circular ring shape and extends about the entire circumference of the actuating piston or of the control piston.

In case no torque is transmitted, the coating is preferably a sliding coating.

A particularly advantageous embodiment results when the control piston is provided with at least one thin bore through which a lubricant can reach the contact region between the two pistons. In this way, the service life of the sliding coating is significantly increased. The lubricant that flows through the fine bores or through valves through the control piston serves at the oppositely positioned side as a lubricating medium for the sliding coating.

Advantageously, the pressure medium with which the control piston is actuated is employed as a lubricant. Accordingly, the bore in the control piston connects the contact region with the pressure chamber that is delimited by the control piston.

It is further advantageous when the actuating piston in the actuating position is surrounded by at least one retaining wall with radial clearance. Due to the retaining wall, the lubricant can be retained as long as possible in the region of the sliding contact. The escape of the lubricant from the sliding gap is thus significantly reduced.

Advantageously, the retaining wall is provided at the control piston, advantageously formed as one piece together with it.

A further improvement of the service life of the sliding coating can be achieved in that the actuating piston and/or the control piston is provided at the end face with a structure for uniform distribution of the lubricant. The structure ensures thus that the lubricant is uniformly distributed across the sliding surface of the sliding coating.

So that the control piston during the occurring relative movement between it and the actuating piston is not caused to rotate, the control piston is secured against rotation about its axis. The anti-rotation action can be provided, for example, by a corresponding configuration of a restoring spring for the control piston. Also, for example, pins or sliding blocks can be distributed about the circumference of the control piston which engage the inner wall of a housing surrounding the control piston.

The actuating device according to invention is characterized according to an embodiment in that the actuating piston is formed by the control piston which interacts immediately with the coupling/braking parts and is provided in the contact region with at least one coating. The control piston serves in this case not only as carrier for the coating but serves at the same time also as an actuating element in order to exert axial pressure on the coupling/braking parts.

The coating can be a sliding coating when the coupling/braking parts during the actuation process rotate relative to the control piston.

When between the coupling/braking parts and the control piston no relative rotation occurs, the coating is then advantageously formed by a friction coating with which the control piston in the actuation situation is pressed against the corresponding counter friction surface.

Such a friction coating can be applied in different ways onto the control piston. In an exemplary fashion it is possible to sinter the friction coating onto the control piston, to apply it in form of a coating by a PVD (physical vapor deposition) method, or to glue it onto the control piston.

The coupling/braking device according to the invention is provided with at least one actuating device according to the invention.

The subject matter of the invention results not only from the subject matter of the individual claims but also from all specifications and features disclosed in the drawings and the description. They are claimed as important to the invention, even if they are not subject matter of the claims, inasmuch as, individually or in combination, they are novel relative to the prior art.

Further features of the invention result from the additional claims, the description, and the drawings.

BRIEF DESCRIPTION OF THE DRAWINGS

The invention will be explained in more detail with the aid of an embodiment illustrated in the drawing.

FIG. 1 shows in schematic illustration, a disc pack coupling with an actuating device according to the invention whose actuating piston is located in an actuation position.

FIG. 2 shows in an illustration corresponding to FIG. 1, the disc pack coupling with the actuating piston in non-actuated position.

FIG. 3 is an end view of a control piston of the actuating device according to FIGS. 1 and 2.

DESCRIPTION OF PREFERRED EMBODIMENTS

Figure 4:
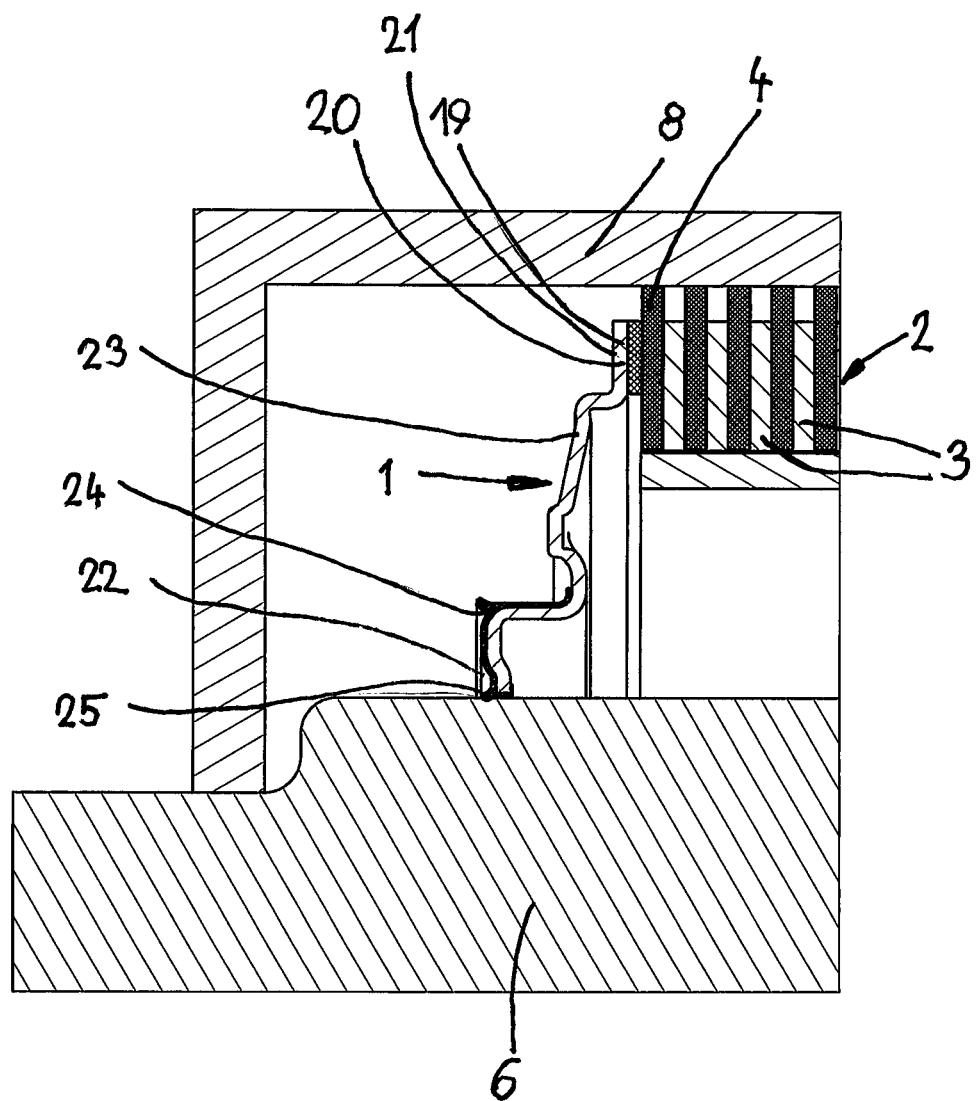
FIG. 4 shows a second embodiment of an actuating piston in actuating position in axial half section view.

FIGS. 1 and 2 show in schematic illustration an example of a high-speed coupling in which a control piston 1 is located outside of a disc pack 2 and preferably is hydraulically actuated. The disc pack 2 comprises inner discs 3 and outer discs 4 which, for torque transmission from a shaft 5 to a shaft 6, are pressed axially against each other. The inner discs 3 that are connected non-rotatably to the shaft 5 are provided with friction coatings (not illustrated). The outer discs 4 that are connected non-rotatably to the shaft 6 are located between neighboring inner discs 3, respectively, and are non-rotatably connected with a coupling basket 7 which, in turn, is non-rotatably connected to the shaft 6. It comprises a shaft bushing 8 having the coupling basket 7 arranged at its inner wall.

FIG. 2 shows the disc pack coupling in open state in which the discs 3, 4 are positioned at a spacing relative to each other. The torque generated by the shaft 5 can thus not be transmitted to the shaft 6.

In order to press the discs 3, 4 axially against each other, an actuating piston 9 is provided that is axially slidable relative to the shaft 6. The actuating piston 9 in the embodiment has an annular piston surface 10 which is positioned coaxially relative to the disc pack 2 and, for closing the disc pack coupling, is axially pressed against the disc pack 2.

In order to generate the contact pressure which is acting on the discs 3, 4 and required for closing the disc pack coupling, the control piston 1 is provided which is accommodated in a housing 11. The control piston 1 delimits a pressure chamber 12 in the housing 11 into which a pressure medium, in the embodiment a hydraulic medium, is introduced. By pressure loading, the control piston 1 is moved from its initial position (FIG. 2) into the control position according to FIG. 1 wherein it forces the actuating piston 9 with its piston surface 10 at the required contact pressure against the disc pack 2 in axial direction. The discs 3, 4 are correspondingly axially compressed so that the torque can be transmitted from the shaft 5 to the shaft 6.

The actuating piston 9 is rotatable together with the shaft 6 about its axis while the control piston 1 is arranged in the housing 11 to be only axially slidable but non-rotatable about its axis.

In the illustrated embodiment, the control piston 1 is an annular piston which is arranged coaxially to the axis of the disc pack coupling.

At its end positioned opposite the piston surface 10, the actuating piston 9 comprises a further annular piston surface 13 which interacts with an annular piston surface 14 of the control piston 1.

Since upon torque transmission the actuating piston 9 is rotated together with the shaft 6, a type of sliding coupling is generated between the two piston surfaces 13, 14 of the two pistons 1, 9. In order to keep the wear of the piston surfaces 13, 14 as minimal as possible, at least one of the two piston surfaces 13, 14 is provided with a sliding coating 15 which improves the sliding and coupling properties. The sliding coating 15 can be, for example, a sliding lacquer or a DLC (diamond-like carbon) coating. Moreover, all materials are of course suitable that reduce wear of the piston surfaces 13, 14 and thus of the two pistons 1 and 9.

In the illustrated embodiment, the sliding coating 15 is provided at the piston surface 13 of the actuating piston 9. Advantageously, the sliding coating 15 completely covers the piston surface 13.

The sliding coating 15 can be provided also at the piston surface 14 of the control piston 1. It is further possible to apply the sliding coating 15 at both piston surfaces 13, 14.

The sliding coating 15 ensures that wear at the contact surfaces of the two pistons 1, 9 is minimal. In this way, the proper function of the disc pack coupling is ensured even over a long service life. This is in particular advantageous when the coupling is a high-speed coupling.

The sliding coating 15 can be simply renewed when it exhibits a corresponding wear.

For improving the service life of the sliding coating 15, the control piston 1 is configured such that the hydraulic medium in the pressure chamber 12 can reach through fine bores 16 in the control piston 1 the contact surface 14 of the control piston 1. In FIGS. 1 and 2, only one bore 16 is illustrated for clarity. Since the bores 16 only have a very small cross section, the leakage loss is very minimal.

At the piston surface 14, the pressure medium forms a lubricant film for the sliding coating 15.

It is advantageous when a structuring is provided in the piston surface 14 of the control piston 1 and is configured such that the pressure medium is uniformly distributed across the piston surface 14 as a lubricant. In this way, a good sliding contact between the sliding coating 15 and the piston surface 14 is ensured.

FIG. 3 shows an example for a structuring 26. For example, it can be formed by depressions which are positioned at a slant relative to the circumferential direction and are positioned at a spacing one after another in circumferential direction. The depressions can be arranged singularly, in pairs, but also in groups.

When the control piston 1 is not actuated and is in its initial position according to FIG. 2, the pressure medium from the pressure chamber 12 can reach unhindered the piston surface 14 via the bores 16.

In order to retain the medium during the actuation of the control piston 1 (FIG. 1) as much as possible in the region of the sliding contact with the sliding coating 15, it is advantageous to provide a retaining ring 17 which can be located in the region between the control piston 1 and the housing 11. In the embodiment, the retaining ring 17 is provided at the control piston 1 and is advantageously embodied as one piece together with it. Since the control piston 1 is embodied as an annular piston, it is provided at the outer and at the inner circumference with a retaining ring 17, respectively. Both retaining rings 17 are positioned coaxially to each other and to the axis of the control piston 1.

When the control piston 1 is in its control position according to FIG. 1, the actuating piston 9 plunges between the two retaining rings 17. Narrow annular spaces 18 are formed between the retaining rings 17 and the actuating piston 9. They form retaining spaces that ensure that the medium remains as long as possible in the region of the sliding contact between the sliding coating 15 and the piston surface 14 of the control piston 1. In this way, a proper lubrication in the sliding contact region is ensured.

When the control piston 1 is moved back by at least one restoring spring (not illustrated) into its initial position and, in this way, the disc pack coupling is opened again, the actuating piston 9 is no longer located between the two retaining rings 17. In this way, the medium can flow directly from the piston surface 14 of the control piston 1 into the gear chamber (FIG. 2).

So that the control piston 1 in its control position is not caused to rotate by the rotating actuating piston 9, the control piston 1 is guided so as to be secured against rotation in the housing 11. As an anti-rotation device, for example, pins or sliding blocks are conceivable which are distributed about the circumference of the control piston 1 in the region between it and the inner wall of the housing 11. Also, it is possible to correspondingly configure the restoring spring with which the control piston 1 in a known manner is retracted from its control position into its rest position such that no rotation of the control piston 1 during the sliding contact with the actuating piston 9 is realized. The described pistons 1, 9 are employed in particular in high-speed couplings in which very high rotary speeds occur which can be in the range between approximately 10,000 rpm to approximately 50,000 rpm (revolutions per minute).

The pistons 1, 9 can be used also in disc pack couplings with rotary speeds in a range known, for example, in internal combustion engines.

Also, the described pistons 1, 9 can be employed in braking devices, in which braking discs are pressed against each other in axial direction.

Advantageously, in conventional disc pack couplings with rotary speeds in a range known, for example, in internal combustion engines, the control piston 1 can be configured and arranged such that it is located within the disc pack coupling in immediate vicinity of the disc pack 2 (FIG. 4). In this case, the control piston 1 constitutes the actuating piston. The control piston 1 is non-rotatably and axially slidably seated on the shaft 6 and is provided at the radial outer rim with a coating 19. In the illustrated embodiment, the coating 19 is a friction coating so that the control piston 1 can interact directly with the discs 3, 4 of the disc pack coupling in order to generate the required contact pressure for closing the disc pack coupling.

The coating 19 is applied to the radial outer rim region on the end face 20 of the control piston 1 which is facing the discs 3, 4. The coating 19 is provided along the rim of the control piston 1 in an annular shape. The part 21 of the control piston 1 which is carrying the coating 19 is flat and lies in a radial plane of the control piston 1. In this way, it is ensure that the coating 19 rest flat against the neighboring disc of the disc pack 2.

The coating 19 in the form of a friction coating can be applied in various ways onto the control piston 1. For example, the coating 19 can be sintered on. A further possibility resides in applying the coating 19 by means of a PVD (physical vapor deposition) method. Also, it is possible to fasten the coating 19 by means of an adhesive on the control piston part 21.

Displacing the control piston 1 can be realized in the same manner as has been described in connection with the embodiment according to FIGS. 1 and 2.

The control piston 1 can be used not only in a coupling but also in a brake. The type of the coating 19 depends on whether by means of the control piston 1 torque is to be transmitted or not. When no torque is to be transmitted, the coating 19 is embodied as a sliding coating. When torque is to be transmitted, the coating 19 is formed by a friction coating. In both cases, it is not decisive whether the control piston 1 is part of a coupling or of a brake.

In the embodiment according to FIG. 4, the control piston 1 fulfills a double function in that it is used for actuating and is also a carrier for the coating 19. In this way, handling when assembling the complete system is simplified and the costs due to the reduced number of parts is reduced.

The radial width of the coating 19 is selected such that the control piston 1 can reliably fulfill the required function.

The control piston 1 has a central opening 22 for passage of the shaft 6. At the rear side 23 which is facing away from the coating 19, the control piston 1 is provided with a seal 24 which is applied to the rear side 23 in a suitable way, for example, by gluing on or by vulcanization and the like. The seal 24 has at least one seal part 25 which in the mounted position is contacting with elastic deformation seal-tightly the circumference of the shaft 6. The seal 24 which is extending about the circumference of the shaft 6 can be comprised of any suitable material, for example, of PTFE or an elastomer.

The described embodiments can be used in particular for couplings in the high-speed sector in connection with electromobility. In the high-speed sector, the rotary speeds can be in a range of approximately 10,000 rpm to approximately 50,000 rpm (revolutions per minute). The described embodiments can also be used in conventional couplings.

The specification incorporates by reference the entire disclosure of German priority document 10 2019 002 213.0 having a filing date of Mar. 25, 2019.

While specific embodiments of the invention have been shown and described in detail to illustrate the inventive principles, it will be understood that the invention may be embodied otherwise without departing from such principles.

What is claimed is:

1. An actuating device for a coupling/braking device, the actuating device comprising:

at least one actuating piston that is axially slidable relative to a shaft and, in an actuating position, is configured to exert an axially acting contact pressure on coupling/braking parts of the coupling/braking device;

at least one control piston configured to axially displace the at least one actuating piston into the actuating position;

a coating provided in a contact region between the at least one actuating piston and the at least one control piston, wherein the coating is disposed at the at least one actuating piston and/or at the at least one control piston.

2. The actuating device according to claim 1, wherein the coating is provided along an outer circumference of the at least one actuating piston.

3. The actuating device according to claim 1, wherein the coating is configured in a circular ring shape and extends about an entire circumference of the at least one actuating piston or of the at least one control piston.

4. The actuating device according to claim 1, wherein the coating is a sliding coating.

5. The actuating device according to claim 1, wherein the at least one control piston comprises at least one bore configured to permit a lubricant to flow to the contact region between the at least one actuating piston and the at least one control piston.

6. The actuating device according to claim 5, wherein the at least one bore connects the contact region with a pressure chamber that is delimited by the at least one control piston.

7. The actuating device according to claim 1, wherein the at least one actuating piston in the actuating position is surrounded by at least one retaining wall at a radial clearance.

8. The actuating device according to claim 7, wherein the at least one retaining wall is arranged at the at least one control piston.

9. The actuating device according to claim 1, wherein the at least one actuating piston comprises an end face provided with a structure configured to uniformly distribute a lubricant.

10. The actuating device according to claim 1, wherein the at least one control piston comprises an end face provided with a structure configured to uniformly distribute a lubricant.

11. The actuating device according to claim 1, wherein the at least one actuating piston comprises an end face provided with a structure configured to uniformly distribute a lubricant, and wherein the at least one control piston comprises an end face provided with a structure configured to uniformly distribute a lubricant.

12. The actuating device according to claim 1, wherein the at least one control piston is secured against rotation about an axis of the at least one control piston.

13. An actuating device for a coupling/braking device, the actuating device comprising:

at least one actuating piston that is axially slidable relative to a shaft and, in an actuating position, is configured to exert an axially acting contact pressure on coupling/braking parts of the coupling/braking device;

wherein the at least one actuating piston is a control piston non-rotatably connected to the shaft and configured to interact immediately with the coupling/braking parts of the coupling/braking device;

at least one coating provided in a contact region between the coupling/braking parts and the at least one control piston.

14. The actuating device according to claim 13, wherein the at least one coating is a sliding coating.

15. The actuating device according to claim 13, wherein the at least one coating is a friction coating.

16. A coupling/braking device comprising at least one actuating device according to claim 1.

17. A coupling/braking device comprising at least one actuating device according to claim 13.

* * * * *